United States Patent Office 3,541,095
Patented Nov. 17, 1970

3,541,095
1-BUTOXY-3-AMINO-2-PROPANOLS
Herman E. Faith, Indianapolis, Ind., assignor to The Dow Chemical Company, Midland, Mich., a corporation of Delaware
No Drawing. Filed Apr. 1, 1968, Ser. No. 717,992
Int. Cl. C07d 31/40, 51/42
U.S. Cl. 260—256.4                                                    5 Claims

ABSTRACT OF THE DISCLOSURE 1-butoxy-3-(2-pyridylamino)-2-propanol and 1-butoxy-3-(2-pyrimidinylamino)-2-propanol and their salts are novel compounds useful as skeletal muscle relaxants in animals.

SUMMARY OF THE INVENTION

This invention is directed to novel 1-butoxy-3-(heterocyclicamino)-2-propanols and their acid addition salts.

More specifically, the compounds of the invention are 1-butoxy-3-(2-pyridylamino)-2-propanol and 1-butoxy-3-(2-pyrimidinylamino)-2-propanol and their pharmaceutically acceptable salts. The basic aminopropanol products have the formula

wherein R represents either of the heterocyclic moieties 2-pyridyl or 2-pyrimidinyl. These new compounds are solids or oils in the free base form, somewhat soluble in common organic solvents and only slightly soluble in water. The products which are acid addition salts are crystalline solids which are soluble in water. The compounds are useful as skeletal muscle relaxants in animals as indicated by their ability to suppress polysynaptic reflexes elicited by electrical stimulation in cats.

The compounds of the invention are prepared by reacting 3-butoxy-1,2-epoxypropane with an amine of the formula R—NH$_2$ in which R represents a 2-pyridyl or a 2-pyrimidinyl moiety.

When R is 2-pyrimidinyl, the reaction is conveniently carried out in the presence of a diluent such as an alcohol. The reactants are mixed together in any suitable fashion for a period of time to complete the reaction. The exact amounts employed are not critical. Good results are obtained by using substantially equimolar proportions of the amine and the epoxypropane compounds. The reaction proceeds smoothly in the temperature range of from about 40° to about 150° C. to produce the desired 1-butoxy-3-amino-2-propanol. When a solvent is employed, the reflux temperature of the medium provides a convenient reaction temperature. After completion of the reaction, the product in the free base form can be separated from any reaction medium by conventional procedures such as fractional distillation or dilution with water and extraction with water-immiscible solvents.

When R is 2-pyridyl, a basic catalyst, such as sodium amide, is necessary to produce the desired product. Any proportions of the reactants can be employed. Good results are realized when substantially equimolar proportions of 2-pyridylamine, the epoxypropane, and the basic catalyst are used. In carrying out the reaction, a diluent or solvent can also be used, liquid ammonia being a convenient choice. The reactants are mixed together in any manner for a period of time to insure completion of the reaction. When the reaction is completed, the product can be separated as a residue by evaporation of any reaction medium. It can be purified by washing with water and extraction with a water-immiscible solvent and further purified by distillation or recrysctallization if desired.

The acid addition salts of this invention can be obtained by reacting the free base forms with a pharmaceutically acceptable acid such as oxalic, fumaric, maleic, succinic, propionic or acetic acids, conveniently in substantially equimolar proportions.

The following examples merely illustrate the invention and are not to be construed as limiting the same.

EXAMPLE 1

31.6 grams (0.24 mole) of 1-butoxy-2,3-epoxypropane was mixed with 25 grams (0.26 mole) of 2-aminopyrimidine and 50 milliliters of ethanol. The resulting mixture was heated at its reflux temperature for 4 hours. At the end of this period, the solvent was evaporated at reduced pressure and the residue obtained dissolved in ethyl ether and washed with water. After drying the ethereal solution, fractional distillation produced 1-butoxy-3-(2-pyrimidinylamino)-2-propanol with a boiling point of 182°–185° C. at 2–3 millimeters of mercury. The oxalate salt of the basic aminopropanol was prepared by mixing equimolar portions of 1-butoxy-3-(2-pyrimidinylamino)-2-propanol and oxalic acid in anhydrous ethanol. After recrystallization from ethanol, the 1-butoxy-3-(2-pyrimidinylamino)-2-propanol monooxalate obtained melted at 100°–101° C.

EXAMPLE 2

20 grams (0.21 mole) of 2-aminopyridine was slowly added to a suspension of 0.24 mole of sodium amide, obtained free of mineral oil from a mineral oil suspension by washing with toluene, in 170 milliliters of liquid ammonia. After this mixture had been stirred for 30 minutes, 26 grams (0.2 mole) of 1-butoxy-2,3-epoxypropane was added during a period of 40 minutes. Ammonia was allowed to evaporate during the next 3 to 4 hours, and 80 milliliters of diethylene glycol dimethyl ether was slowly added to replace the evaporated ammonia and to facilitate stirring. The reaction mixture was allowed to stand overnight and then treated with a small amount of isopropanol to destroy any remaining sodium amide. Water was then added and the resulting mixture extracted with chloroform. Fractional distillation of the extract produced 1-butoxy-3-(2-pyridylamino)-2-propanol at a boiling point of 180° C. at 3 millimeters. The distillate solidified and was recrystallized from low boiling petroleum ether to give the same product with a melting point of 51.5°–52.5° C.

The compounds of the present invention are useful as interneuronal depressant agents (centrally acting skeletal muscle relaxants). They are capable of suppressing the linguomandibular (jaw-opening) reflex in cats. In a representative procedure, cats anesthetized with pentobarbital were given the 1-butoxy-3-amino-2-propanols by intervenous injection of a dilute aqueous suspension of one of the active compounds to provide doses ranging from 8 milligrams per kilogram to 30 milligrams per kilogram. The upper gums of the animals were then electrically stimulated at regular intervals and the reflexive jaw-opening recorded. Cats protected by the compounds of this invention showed suppression of the reflex for significant periods of time as compared to anesthetized but otherwise untreated control animals.

The 1-butoxy-1,2-epoxypropane which is employed as a starting material according to the teaching of the present invention is available commercially or can be prepared by procedures reported in the literature. In one such procedure, epichlorohydrin is treated with 1-butanol in the presence of an acid catalyst. The 3-butoxy-1-chloro-2-propanol obtained is then treated with an alkali metal hydroxide to produce 3-butoxy-1,2-epoxypropane.

What is claimed is:
1. A 1-butoxy-3-substituted amino-2-propanol corresponding to the formula

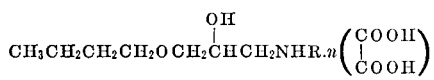

wherein R is 2-pyridyl or 2-pyrimidinyl and $n$ is zero or one.

2. The compound of claim 1 which is 1-butoxy-3-(2-pyridylamino)-2-propanol.
3. The compound of claim 1 which is 1-butoxy-3-(2-pyridylamino)-2-propanol monooxalate.
4. The compound of claim 1 which is 1-butoxy-3-(2-pyrimidinylamino)-2-propanol.
5. The compound of claim 1 which is 1-butoxy-3-(2-pyrimidinylamino)-2-propanol monooxalate.

References Cited

UNITED STATES PATENTS 3,328,417   6/1967   McLoughlin et al. __ 260—256.5

ALEX MAZEL, Primary Examiner

R. J. GALLAGHER, Assistant Examiner

U.S. Cl. X.R.

260—295, 296, 348.9; 424—251, 263